United States Patent
Kurasawa et al.

(10) Patent No.: US 6,608,133 B2
(45) Date of Patent: Aug. 19, 2003

(54) THERMOPLASTIC RESIN COMPOSITION, MOLDED PRODUCT USING THE SAME AND TRANSPORT MEMBER FOR ELECTRIC AND ELECTRONIC PARTS USING THE SAME

(75) Inventors: Yoshihiro Kurasawa, Hiratsuka (JP); Naoto Obayashi, Hiratsuka (JP); Kiyoji Takagi, Hiratsuka (JP); Shigeru Muramatsu, Hiratsuka (JP)

(73) Assignee: Mitsubishi Engineering-Plastics Corp., Tokyo (JP)

( * ) Notice: Subject to any disclaimer, the term of this patent is extended or adjusted under 35 U.S.C. 154(b) by 0 days.

(21) Appl. No.: 09/923,551

(22) Filed: Aug. 7, 2001

(65) Prior Publication Data

US 2002/0040090 A1 Apr. 4, 2002

(30) Foreign Application Priority Data

Aug. 9, 2000 (JP) ........................................ 2000-241068
Oct. 23, 2000 (JP) ........................................ 2000-322619

(51) Int. Cl.$^7$ .............................. C08J 5/10; C08K 3/04; C08L 67/00
(52) U.S. Cl. ........................................ 524/496; 524/495
(58) Field of Search ................................. 524/496, 495

(56) References Cited

U.S. PATENT DOCUMENTS 6,184,280 B1 * 2/2001 Shibuta ........................ 524/405

FOREIGN PATENT DOCUMENTS

JP   03-074465   3/1991
JP   10-211686   8/1998 ........... B32B/27/36

* cited by examiner

Primary Examiner—James J. Seidleck
Assistant Examiner—U. K. Rajguru
(74) Attorney, Agent, or Firm—David G. Conlin; John B. Alexander; Edwards & Angell, LLP (57) ABSTRACT

The present invention relates to a thermoplastic resin composition comprising a thermoplastic resin and hollow carbon fibrils dispersed in the thermoplastic resin, the hollow carbon fibrils being present in an amount of 0.1 to 20% by weight based on the total weight of the composition, comprising independent fibrils and agglomerated fibrils, and having such a dispersing condition, when represented by indices based on the measurement of transmission electron microphotograph, that the ratio of the independent fibrils to the agglomerated fibrils lies within the range of 8/92 to 40/60 and the independent fibrils have an average length of 20 to 200 nm.

10 Claims, 2 Drawing Sheets

THERMOPLASTIC RESIN COMPOSITION, MOLDED PRODUCT USING THE SAME AND TRANSPORT MEMBER FOR ELECTRIC AND ELECTRONIC PARTS USING THE SAME

BACKGROUND OF THE INVENTION

The present invention relates to a thermoplastic resin composition, and more particularly, it relates to a thermoplastic resin composition exhibiting not only excellent mechanical strength and heat resistance, but also excellent electric characteristics such as conductivity and anti-static property, and also relates to a molded product and a transport member for electric and electronic parts produced from the resin composition.

Hitherto, thermoplastic resin compositions have been used in various applications such as transport members for electric and electronic parts, because of excellent mechanical strength and heat resistance thereof and further by improving their electric characteristics. However, thermoplastic resin composition capable of satisfying the mechanical strength, heat resistance and electric characteristics at the same time cannot be readily obtained.

SUMMARY OF THE INVENTION

An object of the present invention is to provide a polycarbonate resin composition which is excellent in mechanical strength, heat resistance and electric characteristics such as conductivity and anti-static property, and is free from contamination by volatile substances, and a transport member for electric and electronic parts produced from the polycarbonate resin composition.

Another object of the present invention is to provide a thermoplastic resin composition exhibiting excellent electric characteristics such as conductivity and anti-static property without deterioration in mechanical strength and heat resistance peculiar to thermoplastic resins, and a molded product produced therefrom.

To attain the above aim, in the first aspect of the present invention, there is provided a thermoplastic resin composition comprising a thermoplastic resin and hollow carbon fibrils dispersed in the thermoplastic resin, the hollow carbon fibrils being present in an amount of 0.1 to 20% by weight based on the total weight of the composition, comprising independent fibrils and agglomerated fibrils, and having such a dispersing condition, when represented by indices based on the measurement of transmission electron microphotograph, that the ratio of the independent fibrils to the agglomerated fibrils lies within the range of 8/92 to 40/60 and the independent fibrils have an average length of 20 to 200 nm.

In the second aspect of the present invention, there is provided a molded product formed from the thermoplastic resin composition as defined in the first aspect of the present invention.

In the third aspect of the present invention, there is provided a polycarbonate resin composition which comprises a polycarbonate resin and a conductive material, and has a weight ratio of the polycarbonate resin to the conductive material of 70/30 to 99.9/0.1 and a volatile matter content of not more than 20 ppm calculated as heptane when measured at 100° C. for 30 minutes using a head-space gas chromatograph.

In a fourth aspect of the present invention, there is provided a transport member for electric and electronic parts formed by molding the polycarbonate resin composition as defined in the third aspect of the present invention.

DETAILED DESCRIPTION OF THE INVENTION

The present invention will be described in detail below. First, the thermoplastic resin composition and the molded product produced from the resin composition according to the first and second aspects of the present invention, respectively, are explained.

(1) Thermoplastic Resin

As the thermoplastic resin used in the resin composition according to the first aspect of the present invention, any meltable and moldable thermoplastic resins may be used without particular limitations.

Specific examples of the thermoplastic resins may include polycarbonates, polyphenylene ethers, polyamides, polyesters, aromatic vinyl compound polymers, polyolefins, polyacetals, polyphenylene sulfides, polysulfones, polyether ether ketones or the like.

Polycarbonate

As the polycarbonates, there may be used aromatic polycarbonates, aliphatic polycarbonates, aromatic-aliphatic polycarbonates. Of these polycarbonates, preferred are aromatic polycarbonates. The aromatic polycarbonates are branched or linear thermoplastic polymers or copolymers which can be produced by reacting an aromatic hydroxy compound with or without a small amount of a polyhydroxy compound, with phosgene or a carbonate diester. The production method of the aromatic polycarbonates may be optionally selected from a phosgene method (interfacial polymerization method), a melt method (transesterification method) and the like. In addition, there may also be used such aromatic polycarbonates which are produced by the melt method and well-controlled in amount of terminal OH groups.

Specific examples of the aromatic dihydroxy compounds may include 2,2-bis(4-hydroxyphenyl)propane (bisphenol A), tetramethyl bisphenol A, bis(4-hydroxyphenyl)-p-diisopropylbenzene, hydroquinone, resorcinol, 4,4-dihydroxydiphenyl or the like. Of these aromatic dihydroxy compounds, preferred is bisphenol A. Further, in order to enhance a flame retardancy of the obtained composition, there may also be used compounds obtained by bonding one or more tetraalkylphosphonium sulfonate groups to the above aromatic dihydroxy compounds, and/or polymers or oligomers having a siloxane structure containing phenolic OH groups at both ends thereof.

The branched aromatic polycarbonates may be produced by replacing a part of the aromatic dihydroxy compound with a polyhydroxy compound such as fluoroglucin, 4,6-dimethyl-2,4,6-tri(4-hydroxyphenyl)hepten-2,4,6-dimethyl-2,4,6-tri(4-hydroxyphenyl)heptane, 2,6-dimethyl-2,4,6-tri(4-hydroxyphenyl)hepten-3,1,3,5-tri(4-hydroxyphenyl)benzene and 1,1,1-tri(4-hydroxyphenyl)ethane; 3,3-bis(4-hydroxyaryl)oxy indole (isatin bisphenol); 5-chloroisatin; 5,7-dichloroisatin; 5-bromoisatin; or the like. The amount of the polyhydroxy compound, etc., used as a part of the aromatic dihydroxy compound is 0.01 to 10 mol %, preferably 0.1 to 2 mol %.

In order to control the molecular weight of the aromatic polycarbonate, there may be used monovalent aromatic hydroxy compounds. Examples of the monovalent aromatic hydroxy compounds may include m- and p-methyl phenols, m- and p-propyl phenols, p-tert-butyl phenol, p-long-chain alkyl-substituted phenols or the like.

Examples of the preferred aromatic polycarbonates may include polycarbonate resins derived from 2,2-bis(4-hydroxyphenyl)propane, or polycarbonate copolymers derived from 2,2-bis(4-hydroxyphenyl)propane and other aromatic dihydroxy compounds. Further, in order to enhance the flame retardancy, the polymers or oligomers having a siloxane structure may be copolymerized with the aromatic polycarbonate. These aromatic polycarbonates may be used alone or in the form of a mixture of any two or more thereof.

The aromatic polycarbonates have a viscosity-average molecular weight of preferably 13,000 to 30,000, more preferably 15,000 to 27,000, especially preferably 17,000 to 24,000 when calculated on the basis of its solution viscosity measured at 25° C. in a methylene chloride solvent. When the viscosity-average molecular weight of the aromatic polycarbonate is less than 13,000, the obtained resin composition may be insufficient in mechanical strength. When the viscosity-average molecular weight of the aromatic polycarbonate is more than 30,000, the obtained resin composition may be poor in moldability.

Polyphenylene Ether

The polyphenylene ether is a homopolymer or copolymer having a structure represented by the general formula:

(1)

wherein Q1 groups are independently halogen, primary or secondary alkyl, aryl, aminoalkyl, hydrocarbon-oxy or halohydrocarbon-oxy; Q2 groups are independently hydrogen, halogen, primary or secondary alkyl, aryl, haloalkyl, hydrocarbon-oxy or halohydrocarbon-oxy; and m is a number of not less than 10.

Examples of the primary alkyl groups as Q1 and Q2 may include methyl, ethyl, n-propyl, n-butyl, n-amyl, isoamyl, 2-methylbutyl, n-hexyl, 2,3-dimethylbutyl, 2-, 3- or 4-methylpentyl, or heptyl. Examples of the secondary alkyl groups as Q1 and Q2 may include isopropyl, sec-butyl or 1-ethylpropyl. Usually, Q1 is alkyl or phenyl, especially alkyl having 1 to 4 carbon atoms; and Q2 is a hydrogen atom.

Preferable homopolymers of the polyphenylene ethers are, for example, those containing 2,6-dimethyl-1,4-phenylene ether units. Preferable copolymers of the polyphenylene ethers are random copolymers containing the above 2,6-dimethyl-1,4-phenylene ether units and 2,3,6-trimethyl-1,4-phenylene ether units in combination. Many preferable homopolymers and random copolymers have been described in various patents and literatures. For example, there may be preferably used such polyphenylene ethers having molecular segments capable of improving characteristics such as molecular weight, melt viscosity and/or impact strength.

The polyphenylene ethers used in the present invention have an intrinsic viscosity of preferably 0.2 to 0.8 dl/g, more preferably 0.2 to 0.7 dl/g, especially preferably 0.25 to 0.6 dl/g when measured at 30° C. in chloroform. When the intrinsic viscosity of the polyphenylene ether is less than 0.2 dl/g, the obtained composition may be deteriorated in impact strength. When the intrinsic viscosity of the polyphenylene ether is more than 0.8 dl/g, the obtained composition may be insufficient in moldability.

Polyamide

The polyamide is a thermoplastic polymer having —CONH— bonds in a main chain thereof. Typical examples of the polyamide may include nylon-4, nylon-6, nylon-6,6, nylon-4,6, nylon-12, nylon-6,10 or the like. In addition, there may also be used crystalline or amorphous polyamides containing known monomer components such as aromatic diamines and aromatic dicarboxylic acids. The amorphous polyamides used herein are those exhibiting substantially no crystallinity when measured by differential scanning calorimeter (DSC). Of these polyamides, preferred are nylon-6, nylon-6,6 and semi-aromatic nylons. The combination of these polyamides and the amorphous polyamides may also be preferably used in the present invention.

Also, the polyamides preferably have a relative viscosity of 2.0 to 6.0 when measured at 25° C. in 98% concentrated sulfuric acid. When the relative viscosity is less than 2.0, the obtained resin composition may be insufficient in mechanical strength. When the relative viscosity is more than 6.0, the obtained resin composition may be poor in moldability.

Polyester

As the polyester, there may be exemplified thermoplastic polyesters produced by polycondensing dicarboxylic acid or its derivative such as lower alkyl ester, acid halide and acid anhydride, with glycol or divalent phenol.

Specific examples of the dicarboxylic acids used for the production of the polyesters may include aliphatic dicarboxylic acids such as oxalic acid, malonic acid, succinic acid, glutaric acid, adipic acid, suberic acid, azelaic acid and sebacic acid; aromatic dicarboxylic acids such as terephthalic acid, isophthalic acid, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, 2,6-naphthalenedicarboxylic acid and 2,7-naphthalenedicarboxylic acid; or mixtures of these carboxylic acids.

Specific examples of the glycols used for the production of the polyesters may include aliphatic glycols such as straight-chain alkylene glycols having 2 to 12 carbon atoms, e.g., ethylene glycol, 1,3-propylene glycol, 1,4-butene glycol, 1,6-hexene glycol and 1,12-dodecamethylene glycol; aromatic glycols such as p-xylylene glycol; and alicyclic glycols such as 1,4-cyclohexane dimethanol. Examples of the divalent phenols may include pyrocatechol, resorcinol, hydroquinone and alkyl-substituted derivatives of these compounds.

As other polyesters usable in the present invention, there may be exemplified those polyesters produced by ring-opening polymerization of lactone. Specific examples of the other polyesters may include polypivalolactone, poly(ε-caprolactone) or the like.

Examples of still other polyesters usable in the present invention may include polyesters in the form of polymers capable of forming liquid crystals in a molten state (thermotropic liquid crystal polymer: TLCP). Typical commercial products of the liquid crystal polymers include "X7G" produced by Eastman Kodak Co., "XYDAR" produced by Dartoco Co., Ltd., "ECONOL" produced by Sumitomo Kagaku Co., Ltd., "VECTORA" produced by Celanese Co., Ltd., or the like.

Among the above-exemplified polyesters, preferred polyesters are polyethylene terephthalate (PET), polybutylene terephthalate (PBT), polynaphthalene terephthalate (PEN), poly(1,4-cyclohexanedimethylene terephthalate) (PCT) and liquid crystal polyesters.

Aromatic Vinyl Compound Polymer

The aromatic vinyl compound polymer used in the present invention include those polymers derived from monomer compounds having structure represented by the general formula (2):

(2)

wherein R is hydrogen, lower alkyl or halogen; Z is hydrogen, lower alkyl, chlorine or vinyl; and n is an integer of 1 to 5.

Specific examples of the aromatic vinyl compound polymers may include polystyrene, rubber-reinforced polystyrene, styrene-acrylonitrile copolymer, acrylonitrile-butadiene-styrene copolymer, styrene-maleic anhydride copolymer, styrene-maleimide copolymer or the like.

Polyolefin

As the polyolefin usable in the present invention, there may be exemplified (α-olefin homopolymers, α-olefin copolymers, copolymers produced from α-olefin (or plural kinds of α-olefins) as main component and the other unsaturated monomer (or plural kinds of unsaturated monomers) as subsidiary component, or the like. The above copolymers may be of any type such as block copolymer, random copolymer, graft copolymer and composite of these copolymers. In addition, there may also be used modified olefin polymers such as chlorinated, sulfonated and carbonylated ones.

Examples of the α-olefin may include ethylene, propylene, buten-1, penten-1, hexen-1, hepten-1, octen-1 or the like. Of these, $C_2$–$C_8$ α-olefins are preferred from the standpoint of commercial availability. Examples of the unsaturated monomers may include acrylic acid and methacrylic acid (both hereinafter referred to merely as "(meth) acrylic acid"), (meth)acrylic acid esters, unsaturated organic acids such as maleic acid or derivatives thereof such as esters and anhydrides, unsaturated alicyclic olefins, or the like.

Specific examples of the polyolefins may include low-density polyethylene, medium-density polyethylene, high-density polyethylene, polypropylene, polybutene, poly-4-methyl-penten-1, propylene-ethylene block or random copolymers, or copolymers of ethylene with other copolymerizable monomers.

Polyacetal

The polyacetal usable in the present invention include high-molecular weight polymers produced by polymerizing formaldehyde or trioxane, for example, homopolymers containing oxymethylene repeating units. In general, these polymers may be terminal-modified to introduce ester end groups or ether end groups thereinto, thereby enhancing the heat resistance and chemical resistance.

The polyacetal may be in the form of a block copolymer. The block copolymers of this type are constituted by homopolymer blocks containing the above oxymethylene repeating units and other polymer blocks. Specific examples of the other polymer blocks may include polyalkylene glycol, polythiol, vinyl acetate-acrylic acid copolymer, and hydrogenated butadiene-acrylonitrile copolymer.

Also, the polyacetal may be in the form of a random copolymer. The random copolymers of this type may be produced by copolymerizing formaldehyde or trioxane with the other aldehyde, cyclic ether, vinyl compound, ketene, cyclic carbonate, epoxide, isocyanate or ether. Specific examples of the compounds copolymerized with formaldehyde or trioxane may include ethylene oxide, 1,3-dioxane, 1,3-dioxepane, epichlorohydrin, propylene oxide, isobutylene oxide and styrene oxide. In general, after the cationic polymerization, the polymerization catalyst is deactivated, and the resultant copolymers are terminal-modified for stabilization thereof. Also, there may be generally used copolymers containing oxymethylene groups as main repeating units and oxyalkylene groups having 2 or more carbon atoms.

Polyohenylene Sulfide

The polyphenylene sulfide used in the present invention is a crystalline resin containing as main constituent, repeating units represented by the structural formula (3):

(3)

As the polymerization method for production of the polyphenylene sulfide, there may be preferably used the method of reacting sodium sulfide and p-dichlorobenzene with each other in an amide-based solvent such as N-methylpyrrolidone and dimethylacetamide or in a sulfone-based solvent such as sulfolane; the method of polymerizing p-dichlorobenzene in the presence of sulfur and sodium carbonate; the method of polymerizing p-dichlorobenzene in a polar solvent in the presence of sodium sulfide, sodium hydrosulfide and sodium hydroxide, or hydrogen sulfide and sodium hydroxide; the method of self-condensing p-chlorothiophenol; or the like. As the polyphenylene sulfide, various polymers are usable in the present invention as long as they contain the above repeating units as main constituents, for example, homopolymers composed of the above repeating units solely, copolymers containing the above repeating units as main components in an amount of not less than 80 mol % and one or more kinds of other repeating units in an amount of less than 20 mol %.

The above various thermoplastic resins may be used alone or in the form of a mixture of any two or more thereof.

Of these thermoplastic resins, at least one resin selected from the group consisting of polycarbonates, polyphenylene ethers, polyamides, polyesters and aromatic vinyl compound polymers, and combinations thereof are preferred.

(2) Hollow Carbon Fibrils

The hollow carbon fibrils used in the present invention are each of a substantially cylindrical shape comprising an outer region constituted by a plurality of substantially continuous layers composed of regularly arranged carbon atoms, and an inner hollow region wherein the respective layers and the hollow region are substantially concentric with a center axis of each cylindrical fibril. In addition, it is preferred that the regularly arranged carbon atoms of the outer region have a graphite structure, and the diameter of the hollow region is 2 to 20 nm.

The hollow carbon fibrils used in the present invention each have an outer diameter of preferably 3.5 to 70 nm, more preferably 4 to 60 nm; and an aspect ratio (ratio of length to outer diameter) of preferably not less than 5, more preferably not less than 10. The hollow carbon fibrils having an outer diameter of less than 3.5 nm may be deteriorated in dispersibility in resins. When the outer diameter of the fibrils is more than 70 nm, the obtained thermoplastic resin molded product may be insufficient in conductivity. When the aspect ratio of the fibrils is less than 5, the obtained thermoplastic resin molded product may be also unsatisfactory in conductivity.

Details of the hollow carbon fibrils are described in Japanese Patent Application Laid-Open (KOHYO) No. 62-500943 (1987) and U.S. Pat. No. 4,663,230. As described in these publications, the hollow carbon fibrils can be produced, for example, by contacting transition metal-containing particles (e.g., alumina-supported iron, cobalt or nickel-containing particles) with a carbon-containing gas such as CO and hydrocarbons at an elevated temperature ranging from 850 to 1,2000° C., and growing fibrous carbon as heat-decomposed product on the transition metal.

The hollow carbon fibrils usable in the present invention are readily commercially available as "GRAPHITE FIBRIL" (tradename) from Hyperion Catalysis International, Inc.

(3) Optional Components

In addition, the thermoplastic resin composition of the present invention may contain, if required, stabilizers such as ultraviolet light absorbers and antioxidants, additives such as pigments, dyes, lubricants, flame retardants and mold-release agents, or inorganic reinforcing materials such as glass fibers, glass flakes, potassium titanate, wollastonite, talc and mica. Further, elastomers ordinarily used as an impact modifier may be added to the thermoplastic resin composition of the present invention.

(4) Contents of Respective Components

The contents of the above-described components are as follows (each content is represented by the unit of % by weight based on the total weight of the thermoplastic resin composition containing the above components (1) to (3)).

The content of the thermoplastic resin is in the range of 80 to 99.9% by weight, preferably 90 to 99.6% by weight, especially preferably 95 to 99.3% by weight based on the total weight of the thermoplastic resin composition. When the content of the thermoplastic resin is less than 80% by weight, the obtained composition may be unsatisfactory in mechanical strength and moldability. When the content of the thermoplastic resin is more than 99.9% by weight, the obtained composition may be insufficient in conductivity.

The content of the hollow carbon fibrils is in the range of 0.1 to 20% by weight, preferably 0.4 to 10% by weight, especially preferably 0.7 to 5% by weight based on the total weight of the thermoplastic resin composition. When the content of the hollow carbon fibrils is less than 0.1% by weight, the obtained composition may be unsatisfactory in conductivity. When the content of the hollow carbon fibrils is more than 20% by weight, the obtained composition may be unsatisfactory in mechanical strength and moldability.

(5) Production of Composition

The thermoplastic resin composition of the present invention can be produced by the method of melt-kneading the above components using various kneaders such as single-screw or multi-screw kneader, Banbury mixer, rolls and Brabender Plastograph, and then cooling and solidifying the kneaded material; the method of adding the above components into an appropriate solvent, e.g., hydrocarbons such as hexane, heptane, benzene, toluene and xylene, or derivatives thereof, and mixing the dissolved components or the dissolved and undissolved components together in a suspended state; or the like. Among these production methods, the melt-kneading method is preferred from the standpoint of low industrial costs, though not limited thereto.

In particular, in order to obtain a well-dispersed composition, there may be preferably used the method of first melt-kneading the thermoplastic resin and the hollow carbon fibrils such that the content of the hollow carbon fibrils lies in the range of 10 to 30% by weight to obtain a master batch, and further melt-kneading the resultant master batch again with the remaining thermoplastic resin.

(6) Dispersina Condition of Hollow Carbon Fibrils

In the thermoplastic resin composition and the thermoplastic resin molded product according to the present invention, the hollow carbon fibrils comprise independent fibrils and agglomerated fibrils. The hollow carbon fibrils contained in the composition and molded product are required to have such a dispersing condition that the ratio of independent fibrils to agglomerated fibrils and the average length of independent fibrils as indices representing the dispersing condition lie within the below-mentioned specific ranges:

Independent/agglomerated fibril ratio=8/92 to 40/60

Average length of independent fibrils=20 to 200 nm

When the ratio of independent fibrils to agglomerated fibrils is out of the above-specified range, the obtained composition may be insufficient in conductivity. When the average length of the independent fibrils is less than 20 nm, the obtained composition may be also insufficient in conductivity. When the average length of the independent fibrils is more than 200 nm, the obtained molded product may show a poor appearance. It is preferred that the ratio of independent fibrils to agglomerated fibrils is 9/91 to 35/65, and the average length of the independent fibrils is 25 to 180 nm. In addition, it is more preferred that the ratio of independent fibrils to agglomerated fibrils is 10/90 to 30/70, and the average length of independent fibrils is 30 to 160 nm.

Figure 1:
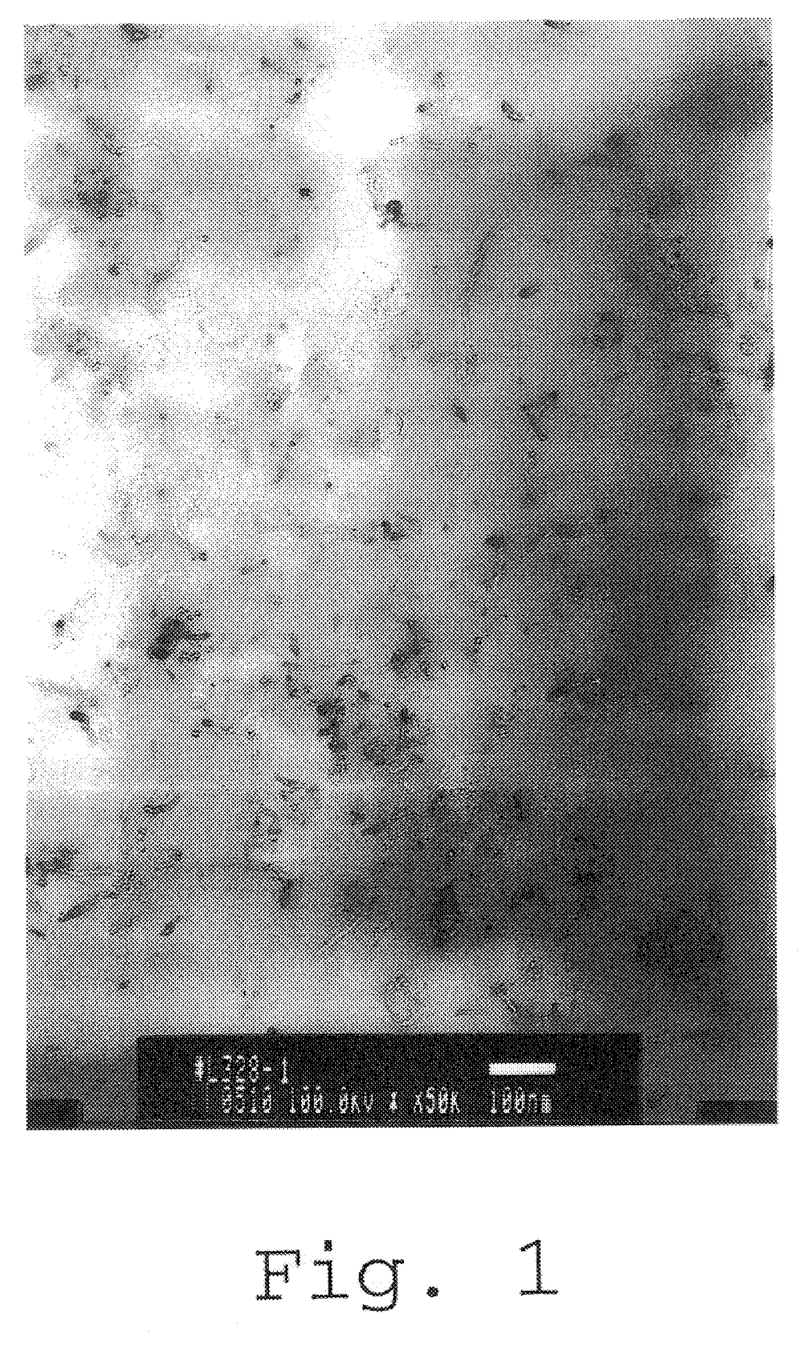
FIG. 1 is a transmission electron microphotograph showing a surface of a cut piece of a molded product obtained in Example 1.
Figure 2:
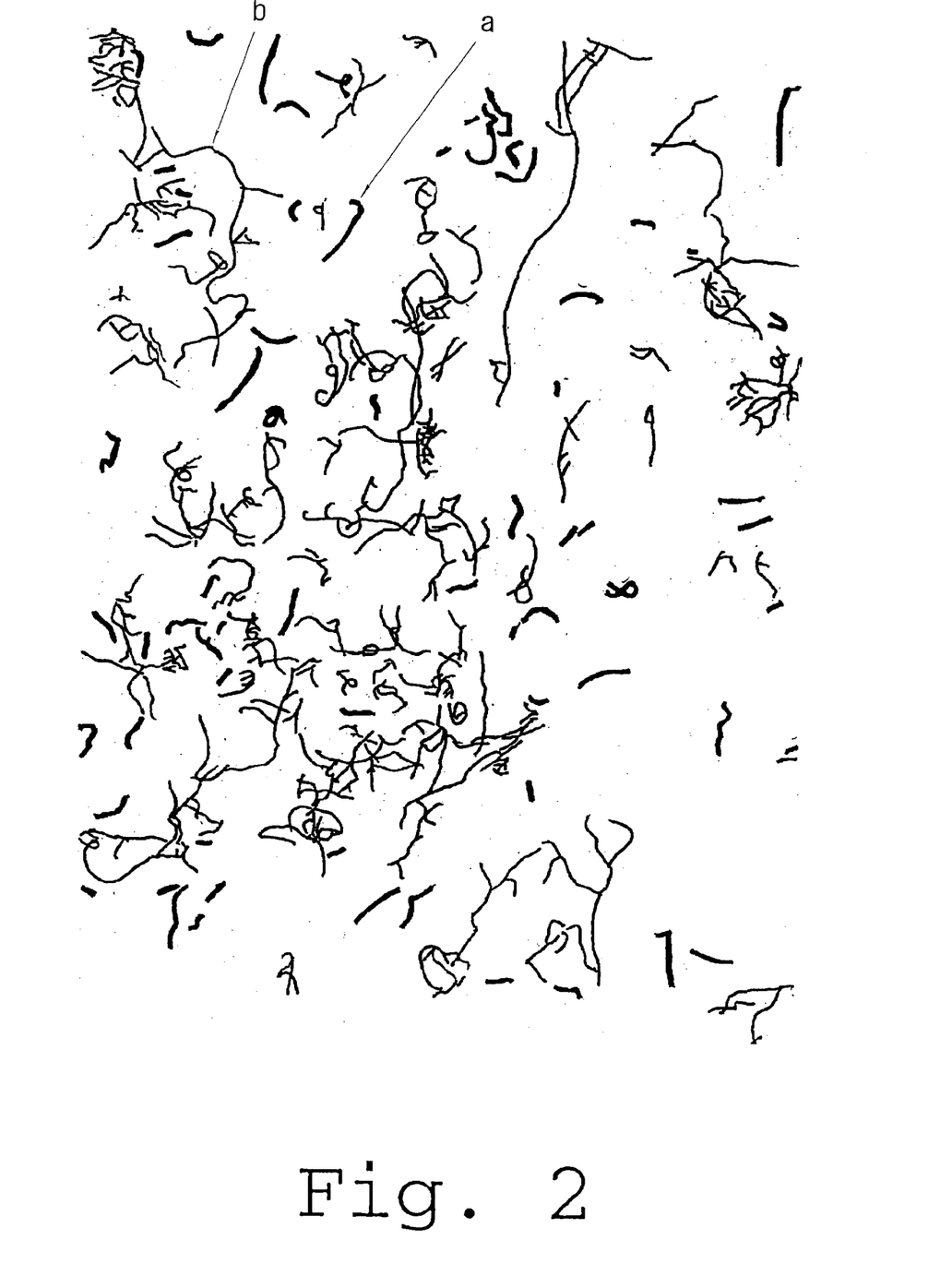
FIG. 2 is a schematic diagram of the transmission electron microphotograph showing a surface of a cut piece of a molded product obtained in Example 1.

The dispersing condition of the hollow carbon fibrils may be readily observed using an electron microscope. Also, the ratio of independent fibrils to agglomerated fibrils and the average length of independent fibrils may be measured from a transmission electron microphotograph having a magnification of 50,000 times. More specifically, the thermoplastic resin molded product is cut into an ultra-thin specimen having a thickness of 60 to 200 nm, preferably 100±20 nm using an ultramicrotome. The thus obtained test piece is placed on a sample base of a transmission electron microscope and irradiated with a transmitted light in the thickness direction of the test piece to take a microphotograph of the surface of test piece in the direction perpendicular to the thickness direction at a magnification of 50,000 times (FIG. 1). The microphotograph shown in FIG. 1 is explained by referring to the schematic view thereof shown in FIG. 2. In FIG. 2, a represents independent fibrils (indicated by thick lines); and b represents agglomerated fibrils (indicated by thin lines). Meanwhile, FIG. 2 is a schematic view prepared only for conceptually representing a relative position between the independent and agglomerated fibrils, and, therefore, the sizes of fibrils appearing on FIG. 2 do not have any relation to actual ones. A plurality of microphotographs are taken at different portions on the surface of the test piece. Then, lengths of whole fibrils appearing on the obtained microphotographs are measured, and classified into lengths of the independent fibrils and those of the agglomerated fibrils. As to the number of fibrils, only the number of the independent fibrils are counted. As a matter of course, the lengths measured on the microphotographs are not absolute lengths of the fibrils themselves, but lengths obtained by projecting the fibrils within the ultra-thin test piece on a predetermined plane. In the present specification, the "ratio of independent fibrils to agglomerated fibrils" and the "average length of independent fibrils" both calculated from the projected lengths according to the following formula, are used as indices for evaluating the dispersing condition.

Independent/agglomerated fibril ratio=(sum of lengths of whole independent fibrils)/(sum of lengths of whole agglomerated fibrils) Average length of independent fibrils=(sum of lengths of whole independent fibrils)/(number of whole independent fibrils)

Here, the "independent fibrils" and the "agglomerated fibrils" are distinguished from each other by the following method. That is, typically, those fibrils each having a continuous cord-like image between opposite ends thereof and not crossing any other fibrils, are regarded as "independent fibrils". Such fibrils forming a loop are also regarded as "independent fibrils" unless they intersect any other fibrils. Fibrils other than the independent fibrils all are regarded as "agglomerated fibrils". Meanwhile, fibrils shown only by point images on the microphotographs are excluded from the calculation of the fibril lengths and from counting of the number of fibrils.

Further, the measurement of the fibril lengths may be carried out using an adequate software for image analysis. In principle, the distance between opposite ends of each fibril image along a centerline thereof is measured using a map measure or the like.

In order to achieve such a dispersing condition of the hollow carbon fibrils, it is important to appropriately set conditions for the melt-kneading step. Specifically, when the shear force used upon the melt-kneading is too high, there tends to be caused severe damage to the hollow carbon fibrils, resulting in shortened length of the independent fibrils. On the contrary, when the shear force is too low, the hollow carbon fibrils are insufficiently dispersed, resulting in increase in content of the agglomerated fibrils. In both the cases, the obtained resin composition may be deteriorated in conductivity.

Optimum conditions for the melt-kneading may vary depending upon type of extruder used and, therefore, are not simply determined. In the case where a twin-screw extruder as a preferred type extruder is used, the cylinder temperature is preferably set to the range between melting point plus 20° C. and melting point plus 100° C. for crystalline resins, and between glass transition temperature plus 100° C. and glass transition temperature plus 180° C. for amorphous resins. In addition, the screw speed is preferably 100 to 300 rpm. As a matter of course, the melt-kneading may be conducted under any conditions as long as the aimed dispersing condition of the hollow carbon fibrils can be achieved, i.e., the above indices therefor lie within the specified ranges.

(7) Molded Product

The method of producing the thermoplastic resin molded product according to the present invention is not particularly restricted. There may be used various molding methods ordinarily used for molding thermoplastic resin compositions, for example, injection-molding method, blow-molding method, extrusion-molding method, sheet-molding method, thermoforming method, rotational molding method and lamination-molding method.

The thermoplastic resin molded product of the present invention can be used in various applications without particular limitations. The especially preferred applications in which the effects of the present invention can be exhibited most remarkably, include transporting and packaging materials for electric and electronic parts, and automobile parts subsequently subjected to electrostatic painting. As the transporting and packaging materials for electric and electronic parts, there may be exemplified trays for IC chips, IC part boxes, wafer trays, circuit board storage boxes, trays or storage boxes for parts such as substrates, housings and heads of optical or magnetic recording media such as CD, DVD and MO, or the like. As the automobile parts subjected to electrostatic painting, there may be exemplified bumpers, fenders, door panels, wheel caps or door handles which are subsequently subjected to electrostatic painting during the finishing step. The molded product of the present invention has a surface resistance of $10^2$ to $10^{12}\Omega$, more preferably $10^4$ to $10^{10}\Omega$. When the surface resistance value is more than $10^{12}\Omega$, the molded product may be insufficient in conductivity. The molded product having a surface resistance as low as less than $10^2\Omega$ tends to cause short circuit when applied to transporting and packaging materials for electric and electronic parts.

In the case where the molded product is applied to the transporting and packaging materials for electric and electronic parts, as the preferred thermoplastic resin contained therein, polycarbonate and polyphenylene ether-based resin may be used from the standpoint of heat resistance and dimensional stability. Also, when the molded product is applied to automobile parts, as the preferred thermoplastic resin contained therein, a blended mixture of polycarbonate and polyester, and a blended mixture of polyphenylene ether and polyamide may be used from the standpoint of stiffness, heat resistance and impact strength. The polyphenylene ether-based resin used herein is a blended mixture of polyphenylene ether and an aromatic vinyl compound polymer which preferably contains the polyphenylene ether in an amount of not less than 40% by weight. In the blended mixture of polycarbonate and polyester, the weight ratio of polycarbonate to polyester is preferably in the range of 9:1 to 5:5, more preferably 8:2 to 6:4. In the blended mixture of polyphenylene ether and polyamide, the weight ratio of polyphenylene ether to polyamide is preferably in the range of 1:9 to 5:5, more preferably 2:8 to 4:6. In addition, the blended mixture of polyphenylene ether and polyamide preferably contains a compatibilizer in order to enhance its compatibility. Examples of the preferred compatibilizer may include those compounds containing both unsaturated group and polar group in the same molecule, such as typically maleic anhydride.

Next, the polycarbonate resin composition and the transporting member for electric and electronic parts which is made of the polycarbonate resin composition, according to the third and fourth aspects of the present invention, are explained.

As polycarbonate resins used in the polycarbonate resin composition according to the third aspect of the present invention, there may be used those polycarbonate resins described as to thermoplastic resins in the thermoplastic resin composition according to the first aspect of the present invention.

The polycarbonate resin preferably has a viscosity-average molecular weight of 14,000 to 30,000 as calculated on the basis of its solution viscosity measured at 25° C. in a methylene chloride solvent. When the viscosity-average molecular weight is less than 14,000, the polycarbonate resin may be poor in mechanical strength. When the viscosity-average molecular weight is more than 30,000, the polycarbonate resin may be insufficient in moldability. The viscosity-average molecular weight of the polycarbonate resin is more preferably 15,000 to 28,000, especially preferably 16,000 to 26,000.

The conductive material used in the polycarbonate resin composition according to the third aspect of the present invention, exhibits an electrical conductivity. As such a conductive material, there may be exemplified conductive organic materials and conductive inorganic materials. Specific examples of the conductive material may include ionic organic surfactants, nonionic organic surfactants, high-molecular anti-static agents having polyethylene glycol units, high-molecular anti-static agents having ionic functional groups, carbon black, carbon fibers, graphite, carbon whiskers, hollow carbon fibrils, metallic fibers, metallic powder, metal oxides or the like. Among these conductive materials, the use of conductive inorganic materials is preferred since these materials are free from volatile substances adhered thereto, or generate only a less amount of volatile substances due to the decomposition of polycarbonate. Examples of the preferred conductive inorganic materials may include carbon fibers, hollow carbon fibrils or the like. Of these conductive inorganic materials, hollow carbon fibrils are more preferred because the fibrils can exhibit a good conductivity even when used in a very small amount.

The hollow carbon fibrils used in the polycarbonate resin composition according to the third aspect of the present invention, are each of a hollow structure, and preferably have a number-average outer diameter of 3 to 70 nm. When the outer diameter is less than 3 nm, the hollow carbon fibrils are poor in dispersibility in resins. When the outer diameter is more than 70 nm, the obtained resin composition tends to be insufficient in conductivity. The number-average outer diameter of the hollow carbon fibrils is more preferably 4 to 60 nm. The aspect ratio of the hollow carbon fibrils is preferably not less than 5 as a number-average value. When the aspect ratio is less than 5, the obtained resin composition tends to be insufficient in conductivity. The aspect ratio of the hollow carbon fibrils is more preferably not less than 7 as a number-average value. The outer diameter and aspect ratio of the hollow carbon fibrils may be determined by observing the fibrils using an electron microscope and subjecting the obtained microphotograph to image analysis.

The hollow carbon fibrils each have a substantially cylindrical shape comprising an outer region constituted by a plurality of substantially continuous layers composed of regularly arranged carbon atoms, and an inner hollow region wherein the respective layers and the inner hollow region are substantially concentric with a center axis of each cylindrical fibril. In addition, it is preferred that the regularly arranged carbon atoms of the outer region have a graphite structure, and the diameter of the inner hollow region is 2 to 20 nm.

The production method and specific products of the hollow carbon fibrils are the same as those described in thermoplastic resin composition according to the first aspect of the present invention. Further, the hollow carbon fibrils used in the polycarbonate resin composition preferably exhibit the same dispersing condition as described as to the thermoplastic resin composition according to the first aspect of the present invention.

The weight ratio of the polycarbonate resin to the conductive material is 70/30 to 99.9/0.1. When the weight ratio is less than 70/30, the obtained composition may be poor in mechanical strength. When the weight ratio is more than 99.9/0.1, the obtained composition may be insufficient in conductivity and anti-static property. The weight ratio of the polycarbonate resin to the conductive material is preferably 75/25 to 99.5/0.5, more preferably 80/20 to 99.2/0.8.

The polycarbonate resin composition of the present invention may further contain, if required, stabilizers such as ultraviolet light absorbers and antioxidants, additives such as pigments, dyes, lubricants, flame retardants and mold-release agents, or reinforcing materials such as glass fibers, glass flakes, talc, mica, potassium titanate, aluminum borate and wollastonite. Further, thermoplastic resins other than the polycarbonate resins may also be added to the polycarbonate resin composition of the present invention. Examples of the thermoplastic resins other than the polycarbonate resins may include polyesters, polyamides, styrene-based resins such as HIPS and ABS, polyolefins or the like. The amount of the thermoplastic resin blended is preferably not more than 40% by weight, more preferably not more than 30% by weight based on the total weight of the resin components contained in the composition. Furthermore, the polycarbonate resin composition of the present invention may further contain elastomers ordinarily used as an impact modifier.

The polycarbonate resin composition of the present invention can be produced by the same method as described as to the thermoplastic resin composition according to the first aspect of the present invention.

The polycarbonate resin composition of the present invention has a volatile matter content of not more than 20 ppm calculated as heptane when measured at 100° C. for 30 minutes using a head-space gas chromatograph. When the volatile matter content is more than 20 ppm, surfaces of IC chips, wafers or hard discs accommodated in the obtained molded product may be contaminated thereby, so that the performance of these electric and electronic parts may be adversely affected. The volatile matter content of the polycarbonate resin composition is preferably not more than 15 ppm, more preferably not more than 10 ppm.

Upon the measurement using a head-space gas chromatograph, after the temperature of the head-space portion is adjusted to 100° C., a sample is introduced into a sampling tube for 30 minutes, and volatile matter components generated therefrom are adsorbed into an adsorbent. Then, the thus adsorbed volatile matter components are introduced into the gas chromatograph to obtain a chromatogram. The quantity of the volatile matter components generated from the sample is determined using a separately prepared calibration curve of heptane as a base. Also, such materials for which a retention time in the gas chromatogram has been already known, may be subjected to qualitative analysis.

In the present invention, any methods may be used in order to reduce the volatile matter content. In particular, there may be used the method of lessening volatile matter components contained in the polycarbonate resin before melt-kneading thereof, the method of removing volatile matter components from the polycarbonate resin during melt-kneading thereof, or the like. In order to lessen volatile matter components contained in the polycarbonate resin before melt-kneading thereof, the polycarbonate resin is dried at an elevated temperature, or dried for a prolonged period of time. Specifically, it is preferable to melt-knead such a polycarbonate resin having a volatile matter content of not more than 300 ppm calculated as heptane when measured at 100° C. for 30 minutes using the head-space gas chromatograph.

In order to remove volatile matter components from the polycarbonate resin during melt-kneading thereof, it is preferred that the polycarbonate resin is strongly deaerated upon the melt-kneading. The reduced pressure used upon the deaeration is preferably not more than 15 torr, more preferably not more than 10 torr, especially preferably not more than 5 torr. In addition, 0.1 to 5 parts by weight of water may be added to 100 parts by weight of the polycarbonate resin, and the resultant mixture may be melt-kneaded and subjected to azeotropy to remove volatile matter components together with water from the polycarbonate resin.

The transporting member for electric and electronic parts according to the present invention can be obtained by molding the above polycarbonate resin composition. The molding method used for the production of the transporting member is not particularly restricted. There may be used various molding methods ordinarily used for molding thermoplastic resin compositions, for example, injection-molding method, blow-molding method, extrusion-molding method, sheet-molding method, thermoforming method, rotational molding method and lamination-molding method.

Examples of the transporting member for electric and electronic parts may include trays for IC chips, IC part boxes, wafer trays or casings, trays or storage boxes for circuit board, trays or storage boxes for parts such as substrates, housings and heads of optical or magnetic recording media such as CD, DVD and MO, or the like. Since the transporting member for electric and electronic parts must be free from adhesion of dusts or debris thereto, the transporting member is required to exhibit a low surface resistance. However, when the surface resistance is too low, defects such as short circuit tend to be caused. The surface resistance of the transporting member for electric and electronic parts is preferably $10^3$ to $10^{12}\Omega$, more preferably $10^3$ to $10^{10}\Omega$.

Also, the transporting member for electric and electronic parts is required to exhibit a good anti-static performance in order to avoid adhesion of dusts thereto. The anti-static performance may be evaluated by measuring a static charge relative value using a static honest meter. The static charge relative value is an index for indicating unlikeness of electrification, and a smaller static charge relative value is preferred for attaining a higher anti-static performance. Specifically, the static charge relative value of the transporting member is preferably not more than 5 mV, more preferably not more than 2 mV when applying a voltage of 10 kV thereto.

The thermoplastic resin molded product of the present invention is advantageously used in various industrial applications such as parts for OA devices, transporting and packaging materials for electric and electronic parts, and automobile parts subjected to electrostatic painting, because of excellent mechanical strength, heat resistance and impact strength as well as improved conductivity and anti-static performance thereof. In particular, the transporting and packaging materials for electric and electronic parts according to the present invention show a very large industrial value, because these materials do not contaminate the surface of IC chip, wafer or hard disc, nor cause any problems due to the contamination, and can exhibit excellent mechanical strength, heat resistance, conductivity and anti-static property.

EXAMPLES

The present invention will be described in more detail by reference to the following examples. However, these examples are only illustrative and not intended to limit the present invention thereto.

In the following Examples and Reference Examples, the below-mentioned components were used.
(A) Polycarbonate
(A-1) Polycarbonate 1
3.7 kg of sodium hydroxide was dissolved in 42 liters of water. While maintaining the obtained solution at 20° C., 7 kg of 2,2-bis(4-hydroxyphenyl)propane and 15 g of hydrosulfide were dissolved therein. The solution was further mixed with 30 liters of methylene chloride and then with 148 g of p-t-butylphenol while stirring. Then, 3.5 kg of phosgene was blown into the solution for 60 minutes. After completing the blowing of phosgene, the reaction solution was vigorously agitated and emulsified. The emulsified reaction solution was mixed with 8 ml of triethylamine, and further continuously stirred for about one hour to conduct the polymerization. The obtained polymerization reaction solution was separated into a water phase and an organic phase. The organic phase was neutralized with phosphoric acid, and then repeatedly washed with a wash solution until the pH value of the wash solution became neutral. Thereafter, the obtained solution was mixed with 35 liters of isopropanol to precipitate polymers. The precipitated polymers were filtered out, washed with 35 liter of heptane, and then filtered again. Then, the filter cake was dried at 120° C. for 7 hours to obtain polycarbonate in the form of a while powder. The obtained polycarbonate had a volatile matter content of 100 ppm calculated as heptane when measured at 100° C. for 30 minutes using a head-space gas chromatograph, and a viscosity-average molecular weight of 21,000.
(A-2) Polycarbonate 2
The same procedure as defined above was conducted except that the filter cake was dried at 120° C. for 2 hours to obtain polycarbonate in the form of a white powder. The obtained polycarbonate had a volatile matter content of 700 ppm calculated as heptane when measured at 100° C. for 30 minutes using a head-space gas chromatograph, and a viscosity-average molecular weight of 21,000.
(A-3) Polycarbonate 3
Poly-4,4-isopropylidnediphenylcarbonate produced by Mitsubishi Engineering-Plastics Corporation; viscosity-average molecular weight: 21,000.
(B) Other Thermoplastic Resin
(B-1) Polyphenylene Ether
Poly-2,6-dimethyl-1,4-phenylene ether produced by Mitsubishi Engineering-Plastics Corporation; intrinsic viscosity as measured at 30° C. in chloroform: 0.40 dl/g (hereinafter referred to merely as "PPE").
(B-2) Polyamide
Polyamide 6 produced by Kanebo Co., Ltd.; tradename: "KANEBO NYLON MC112L"; relative viscosity as measured at 25° C. in 98% sulfuric acid: 2.7 (hereinafter referred to merely as "PA-1").
(B-3) Polyamide
Polyamide 6 produced by Kanebo Co., Ltd.; tradename: "KANEBO NYLON MC161"; relative viscosity as measured at 25° C. in 98% sulfuric acid: 6.5 (hereinafter referred to merely as "PA-2").
(B-4) Polyester
Polybutylene terephthalate produced by Mitsubishi Engineering-Plastics Corporation; tradename: "NOVADOL 5010" (hereinafter referred to merely as "PBT").
(B-5) Aromatic Vinyl Compound Polymer
Rubber-reinforced polystyrene produced by A & M STYRENE Co., Ltd.; tradename: "A & M STYRENE HT478".
(C) Hollow Carbon Fibrils
(C-1) Hollow Carbon Fibrils
Master batch containing 15% by weight of Graphite Fibril BN and 85% by weight of polycarbonate; tradename: "PC/15BN" produced by Hyperion Catalysis International, Inc. (Graphite Fibril BN: hollow carbon fibrils having an outer diameter of 10 nm, a length of 5,000 nm and a number-average aspect ratio of 500).

(C-2) Hollow Carbon Fibrils

Master batch containing 20% by weight of Graphite Fibril BN and 80% by weight of polyamide 6; tradename: "PA/20BN" produced by Hyperion Catalysis International, Inc. (Graphite Fibril BN: hollow carbon fibrils having an outer diameter of 10 nm and a length of 5,000 nm).

(C-3) Hollow Carbon Fibrils

Master batch containing 20% by weight of Graphite Fibril BN and 80% by weight of polystyrene; tradename: "PS/20BN" produced by Hyperion Catalysis International, Inc. (Graphite Fibril BN: hollow carbon fibrils having an outer diameter of 10 nm and a length of 5,000 nm).

(D) Other Conductive Materials (D-1) Carbon Fibers

Carbon fibers having a volume resistivity of 10 $\mu\Omega$m produced by Toho Rayon Co., Ltd.; tradename: "BESPHITE C6-SR" (hereinafter referred to merely as "CF").

(D-2) Carbon Black

Carbon black produced by Lion Co., Ltd.; tradename: "KECHEN EC" (hereinafter referred to merely as "CB").

(E) Other Additives (E-1) Elastomer

Hydrogenated styrene-butylene-styrene block copolymer produced by Shell Chemicals Co.; tradename: "CLAYTON" G1651" (hereinafter referred to merely as "SEBS").

(E-2) Elastomer

Core-shell type elastomer composed of acrylic resin (core) and butadiene (shell) produced by Kureha Chemical Industries Co., Ltd.; tradename: "PARALOID EXL2603" (hereinafter referred to merely as "EXL").

(E-3) Compatibilizer

Maleic anhydride; guaranteed reagent (hereinafter referred to merely as "MANH")

Various characteristics were evaluated by the following methods.

(1) Flexural Modulus

Three-point bending test was performed by the bending test method according to ASTM D790.

(2) Deflection Temperature Under Load

Load-deflection test was performed under a load of 1.82 MPa according to ASTM D648.

(3) Surface Resistance

A rectangular plate-shaped molded product having a size of 50 mm×90 mm×3.2 mmt was measured by LORESTA or HIRESTA manufactured by Mitsubishi Chemical Corporation. (those having a surface resistance of not less than $10^4 \Omega$ was measured using HIRESTA, and those having a surface resistance of less than $10^4 \Omega$ was measured using LORESTA).

(4) Anti-static Performance

A rectangular plate-shaped molded product having a size of 50 mm×90 mm×3.2 mmt was measured to determine its static charge relative value. The measurement of the static charge relative value was performed by applying a voltage of 10 kV for one minute using a Static Honest Meter.

(5) Volatile Matter Content 1.5 g of pellets were placed in a sampling tube of a head-space apparatus ("JHS-100A" manufactured by Nippon Bunseki Kogyo Co., Ltd.), and allowed to stand at 100° C. for 30 minutes to adsorb volatile matter components into an adsorption tube using He as a carrier gas. The adsorbed volatile matter components were introduced into a gas chromatograph ("HP5890A" manufactured by Yokogawa Co., Ltd.), heated therein from 40° C. up to 300° C. at a temperature rise rate of 10° C./minute using He as a carrier gas, and then subjected to FID detection. The obtained gas chromatogram was analyzed using a previously prepared heptane calibration curve as a base to determine the volatile matter content calculated as heptane.

(6) Izod Impact Strength

A test piece having a thickness of 3.2 mm was subjected to notched Izod impact test according to ASTM D256.

(7) Dispersing Condition of Hollow Carbon Fibrils

An ultra-thin test piece having a thickness of 100 nm was cut from a central portion of a rectangular plate-shaped molded product having a size of 50 mm×90 mm×3.2 mmt. The thus obtained test piece was observed by a transmission electron microscope to take a microphotograph at a magnification of 50,000 times. Then, lengths of whole hollow carbon fibrils appearing on the obtained microphotograph were measured using a map measure, and classified into lengths of independent fibrils and those of agglomerated fibrils to calculate sums of lengths of the respective fibrils. At the same time, the number of the independent fibrils appearing in the microphotograph were counted. These measured values were used to calculate the ratio of independent fibrils to agglomerated fibrils and the average length of the independent fibrils.

Example 1

A raw material containing the polycarbonate 1 and the hollow carbon fibril master batch at a weight ratio of 90/10 was uniformly mixed using a tumbler mixer, and pelletized using a 30 mm$\phi$ twin-screw extruder at a cylinder temperature of 300° C. under a vented vacuum pressure of 15 torr. The thus obtained pellets were injection-molded using an injection-molding machine manufactured by Sumitomo Nestal Co., Ltd. (clamping force: 75 T) at a cylinder temperature of 280° C. and a mold temperature of 80° C. to obtain a molded product. The thus obtained molded product was subjected to various evaluations.

Example 2

The same procedure as defined in Example 1 was conducted except that the vented vacuum pressure was changed to 4 torr, thereby performing the pelletization as well as the production and various evaluations of molded product.

Example 3

The same procedure as defined in Example 2 was conducted except that the polycarbonate 2 was used instead of the polycarbonate 1, thereby performing the pelletization as well as the production and various evaluations of molded product.

Example 4

The polycarbonate 1 was fed to a 30 mm$\phi$ twin-screw extruder at a cylinder temperature of 300° C., and carbon fibers were fed through a feed port provided at a downstream side thereof such that the weight ratio of the polycarbonate 1 to the carbon fibers was 85/15. The resultant mixture was pelletized under a vented vacuum pressure of 15 torr. The thus obtained pellets were injection-molded in the same manner as defined in Example 1 to obtain a molded product. The obtained molded product was subjected to various evaluations.

Example 5

The same procedure as defined in Example 4 was conducted except that the vented vacuum pressure was changed to 4 torr, thereby performing the pelletization as well as the production and various evaluations of molded product.

Example 6

The pellets obtained in Example 1 were molded to produce a transporting and storing container for hard disc substrates. A hard disc substrate was accommodated in the container, and allowed to stand at 23° C. for 168 hours. Then, the hard disc substrate was removed from the container, and the surface thereof was washed with acetone. The recovered acetone wash solution was analyzed by a gas chromatogram. The chromatographic analysis showed that no organic substances were detected from the wash solution. As a result, it was confirmed that the surface of the hard disc substrate was not contaminated and, therefore, maintained in a normal state. In addition, the obtained container had a surface resistance of $4 \times 10^6 \Omega$.

The results of Examples 1 to 5 are shown in Table 1.

TABLE 1

|  | Ex. 1 | Ex. 2 | Ex. 3 | Ex. 4 | Ex. 5 |
| --- | --- | --- | --- | --- | --- |
| Polycarbonate 1 (wt. part) | 98.5 | 98.5 | — | 85 | 85 |
| Polycarbonate 2 (wt. part) | — | — | 98.5 | — | — |
| Hollow carbon fibril (wt. part) | 1.5 | 1.5 | 1.5 | — | — |
| Carbon fiber (wt. part) | — | — | — | 15 | 15 |
| Volatile matter content (ppm) | 5 | 2 | 12 | 11 | 9 |
| Flexural modulus (MPa) | 2,320 | 2,320 | 2,320 | 9,850 | 9,850 |
| Deflection temperature under load (° C.) | 134 | 135 | 134 | 145 | 145 |
| Surface resistance ($\Omega$) | $4 \times 10^6$ | $4 \times 10^6$ | $4 \times 10^6$ | $3 \times 10^3$ | $3 \times 10^3$ |
| Static charge relative value (mV) | 0.1 | 0.1 | 0.1 | 0.8 | 0.8 |

Reference Example 1

The same procedure as defined in Example 1 was conducted except that the vented vacuum pressure was changed to 600 torr, thereby performing the pelletization as well as the production and various evaluations of molded product.

Reference Example 2

The same procedure as defined in Example 4 was conducted except that the polycarbonate 2 was used instead of the polycarbonate 1, thereby performing the pelletization as well as the production and various evaluations of molded product.

Reference Example 3

The same procedure as defined in Example 1 was conducted except that no conductive material was blended in the resin composition, thereby performing the pelletization as well as the production and various evaluations of molded product.

The results of Reference Examples 1 to 3 are shown in Table 2.

TABLE 2

|  | Ref. Ex. 1 | Ref. Ex. 2 | Ref. Ex. 3 |
| --- | --- | --- | --- |
| Polycarbonate 1 (wt. part) | 98.5 | — | — |
| Polycarbonate 2 (wt. part) | — | 85 | 100 |
| Hollow carbon fibril (wt. part) | 1.5 | — | — |
| Carbon fiber (wt. part) | — | 15 | — |
| Volatile matter content (ppm) | 52 | 32 | 17 |
| Flexural modulus (MPa) | 2,320 | 9,850 | 2,290 |
| Deflection temperature under load (° C.) | 133 | 144 | 135 |
| Surface resistance ($\Omega$) | $4 \times 10^6$ | $3 \times 10^3$ | $\geq 10^{13}$ |
| Static charge relative value (mV) | 0.1 | 0.7 | 21 |

Examples 7 to 9

Each resin composition shown in Table 3 was uniformly mixed using a tumbler mixer, and then pelletized using a 30 mm$\phi$ twin-screw extruder at a cylinder temperature of 300° C. and a screw speed of 150 rpm. The thus obtained pellets were injection-molded using an injection-molding machine manufactured by Sumitomo Nestal Co., Ltd. (clamping force: 75 T) at a cylinder temperature of 280° C. and a mold temperature of 80° C. to obtain a molded product. The thus obtained molded product was evaluated by the above-mentioned methods.

The results are shown in Table 3. As apparent from Table 3, the obtained molded product showed a low surface resistance, and was small in both static charge relative value and its half-value period as indices of anti-static performance. Also, the molded product was excellent in mechanical strength and heat resistance. In addition, the hollow carbon fibrils contained in the molded product exhibited a good dispersing condition. As a result, it was confirmed that the molded product was usable as a transporting and packaging material for electric and electronic parts.

Reference Example 4

The same procedure as defined in Example 9 was conducted except that the cylinder temperature and the screw speed were changed to 240° C. and 400 rpm, respectively, thereby performing the production and various evaluations of molded product.

The results are shown in Table 4. As apparent from Table 4, the obtained molded product showed a low impact strength and a high surface resistance, and was high in static charge relative value, i.e., deteriorated in anti-static performance. Also, the hollow carbon fibrils contained in the molded product exhibited a poor dispersing condition.

Reference Example 5

The same procedure as defined in Example 9 was conducted except that a 40 mm$\phi$ single-screw extruder was used instead of the twin-screw extruder, and the cylinder temperature and the screw speed were changed to 280° C. and 50 rpm, respectively, thereby performing the production and various evaluations of molded product.

The results are shown in Table 4. As apparent from Table 4, the obtained molded product showed a low impact strength and a high surface resistance, and was high in static charge relative value, i.e., deteriorated in anti-static performance. Also, the hollow carbon fibrils contained in the molded product exhibited a poor dispersing condition.

Reference Example 6

The same procedure as defined in Reference Example 4 was conducted except that the amount of the hollow carbon fibrils blended was varied as shown in Table 3, thereby performing the production and various evaluations of molded product.

The results are shown in Table 4. As apparent from Table 4, the obtained molded product suitably showed a low surface resistance, but was deteriorated in impact strength. Also, the hollow carbon fibrils contained in the molded product exhibited a poor dispersing condition.

Reference Example 7

The same procedure as defined in Example 7 was conducted except that carbon fibers were blended in such an amount as shown in Table 3 instead of the hollow carbon fibrils, and fed through another feed port provided on a downstream side of the extruder, thereby performing the production and various evaluations of molded product.

The results are shown in Table 4. As apparent from Table 4, the obtained molded product showed a too low surface resistance and a very long half-value period, i.e., was deteriorated in anti-static performance. In addition, the molded product had a considerably low impact strength, and exhibited a poor appearance due to remarkable float of the filler on the surface thereof.

Reference Example 8

The same procedure as defined in Example 1 was conducted except that carbon black was blended in such an amount as shown in Table 3 instead of the hollow carbon fibrils, thereby performing the production and various evaluations of molded product.

The results are shown in Table 4. As apparent from Table 4, the obtained molded product showed a high surface resistance and a high static charge relative value, i.e., was deteriorated in anti-static performance. In addition, the molded product had a considerably low impact strength, and exhibited a poor appearance due to slight float of the filler on the surface thereof.

Examples 10 to 13

First and second feeds having blending ratios as shown in Table 5 were respectively uniformly mixed in a tumbler mixer. The obtained two mixtures were fed into a 30 mm$\phi$ twin-screw extruder through two separate feed ports, respectively, and then extruded therefrom at a cylinder temperature of 300° C. and a screw speed of 150 rpm, thereby obtaining pellets. The thus obtained pellets were injection-molded using an injection-molding machine manufactured by Sumitomo Nestal Co., Ltd. (clamping force: 75 T) at a cylinder temperature of 280° C. and a mold temperature of 80° C. to obtain a molded product. The thus obtained molded product was evaluated by the above-mentioned methods.

The results are shown in Table 5. As apparent from Table 5, the obtained molded product showed a low surface resistance, and was excellent in mechanical strength and heat resistance. In addition, the hollow carbon fibrils contained in the molded product exhibited a good dispersing condition. As a result, it was confirmed that the molded product was usable as automobile parts subjected to electrostatic painting.

Reference Example 9

The same procedure as defined in Example 11 was conducted except that the cylinder temperature and the screw speed were changed to 240° C. and 400 rpm, respectively, thereby performing the production and various evaluations of molded product.

The results are shown in Table 6. As apparent from Table 6, the obtained molded product showed a low impact strength and a high surface resistance. Also, the hollow carbon fibrils contained in the molded product exhibited a poor dispersing condition.

Reference Example 10

The same procedure as defined in Example 11 was conducted except that the first and second feeds were fed into the same tumbler mixer and uniformly mixed therein not in separate parts but as one batch, and then the resultant mixture was fed into a 40 mm$\phi$ single-screw extruder used instead of the 30 mm$\phi$ twin-screw extruder through its sole feed port, and further except that cylinder temperature and the screw speed were changed to 280° C. and 50 rpm, respectively, thereby performing the production and various evaluations of molded product.

The results are shown in Table 6. As apparent from Table 6, the obtained molded product showed a low impact strength and a high surface resistance. Also, the hollow carbon fibrils contained in the molded product exhibited a poor dispersing condition.

Reference Example 11

The same procedure as defined in Example 11 was conducted except that PA-1 contained in the second feed was changed to PA-2, thereby performing the production and various evaluations of molded product.

The results are shown in Table 6. As apparent from Table 6, the obtained molded product had a high impact strength, but showed a high surface resistance. Also, the hollow carbon fibrils contained in the molded product exhibited a poor dispersing condition.

Examples 14 to 16

Each resin composition as shown in Table 7 was uniformly mixed using a tumbler mixer, and then pelletized using a 30 mm$\phi$ twin-screw extruder at a cylinder temperature of 300° C. and a screw speed of 150 rpm. The thus obtained pellets were injection-molded using an injection-molding machine manufactured by Sumitomo Nestal Co., Ltd. (clamping force: 75 T) at a cylinder temperature of 280° C. and a mold temperature of 80° C. to obtain a molded product. The thus obtained molded product was evaluated by the above-mentioned methods.

The results are shown in Table 7. As apparent from Table 5, the obtained molded product showed a low surface resistance, and was excellent in mechanical strength and heat resistance. In addition, the hollow carbon fibrils contained in the molded product exhibited a good dispersing condition. As a result, it was confirmed that the molded product was usable as automobile parts subjected to electrostatic painting.

Reference Example 12

The same procedure as defined in Example 16 was conducted except that the cylinder temperature and the screw speed were changed to 240° C. and 400 rpm, respectively, thereby performing the production and various evaluations of molded product.

The results are shown in Table 8. As apparent from Table 8, the obtained molded product showed a low impact strength and a high surface resistance. Also, the hollow carbon fibrils contained in the molded product exhibited a poor dispersing condition.

Reference Example 13

The same procedure as defined in Example 16 was conducted except that the amounts of PC and hollow carbon fibrils blended were varied as shown in Table 8, thereby performing the production and various evaluations of molded product.

The results are shown in Table 8. As apparent from Table 8, the obtained molded product had a low surface resistance, but showed a low impact strength. Also, the hollow carbon fibrils contained in the molded product exhibited a poor dispersing condition.

Reference Example 14

The same procedure as defined in Example 14 was conducted except that the amounts of PC and hollow carbon fibrils blended were varied as shown in Table 8, thereby performing the production and various evaluations of molded product.

The results are shown in Table 8. As apparent from Table 8, the obtained molded product had a high impact strength, but showed a high surface resistance.

Examples 17 and 18

Each resin composition having a blending ratio as shown in Table 9 was uniformly mixed using a tumbler mixer, and then pelletized using a 30 mm$\phi$ twin-screw extruder at a cylinder temperature of 320° C. and a screw speed of 150 rpm. The thus obtained pellets were injection-molded using an injection-molding machine manufactured by Sumitomo Nestal Co., Ltd. (clamping force: 75T) at a cylinder temperature of 300° C. and a mold temperature of 80° C. to obtain a molded product. The thus obtained molded product was evaluated by the above-mentioned methods.

The results are shown in Table 9. As apparent from Table 9, the obtained molded product showed a low surface resistance, and was small in both static charge relative value and its half-value period as indices of anti-static performance. Also, the molded product was excellent in mechanical strength and heat resistance. In addition, the hollow carbon fibrils contained in the molded product exhibited a good dispersing condition. As a result, it was confirmed that the molded product was usable as a transporting and packaging material for electric and electronic parts.

Reference Example 15

The same procedure as defined in Example 17 was conducted except that the cylinder temperature and the screw speed were changed to 260° C. and 400 rpm, respectively, thereby performing the production and various evaluations of molded product.

The results are shown in Table 9. As apparent from Table 9, the obtained molded product showed a low impact strength and a high surface resistance, and further had a high static charge relative value, i.e., was deteriorated in anti-static performance. Also, the hollow carbon fibrils contained in the molded product exhibited a poor dispersing condition.

Example 13

The resin composition obtained in Example 1 was injection-molded to produce a transporting and storing container for hard disc substrates. The obtained container showed a surface resistance as low as $3\times10^7 \Omega$. In addition, the container was frictionally rubbed with Bencot ten times, and then the static voltage thereon was measured using KASUGA KSD-0102. As a result, it was confirmed that the static voltage of the container was 0 V and, therefore, the container showed a good anti-static performance.

Example 14

The resin composition obtained in Example 11 was injection-molded to produce a transporting tray for IC chips. The obtained tray showed a surface resistance as low as $4\times10^7 \Omega$. In addition, the tray was frictionally rubbed with Bencot ten times, and then the static voltage thereon was measured using KASUGA KSD-0102. As a result, it was confirmed that the static voltage of the tray was 0 V and, therefore, the tray showed a good anti-static performance.

Example 15

The resin composition obtained in Example 4 was injection-molded to produce an automobile fender. The obtained fender showed a surface resistance as low as $6\times10^7 \Omega$. In addition, the fender was subjected to electrostatic painting. As a result, it was confirmed that the fender exhibited a good adhesion of paint to the surface thereof.

Example 16

The resin composition obtained in Example 8 was injection-molded to produce an automobile fender. The obtained fender showed a surface resistance as low as $6\times10^8 \Omega$. In addition, the fender was subjected to electrostatic painting. As a result, it was confirmed that the fender exhibited a good adhesion of paint to the surface thereof.

TABLE 3

| Evaluation items | Unit | Ex. 7 | Ex. 8 | Ex. 9 |
|---|---|---|---|---|
| Composition | | | | |
| PC | wt. % | 92 | 90 | 88 |
| Master batch PC/15BN | | 8 | 10 | 12 |
| (Hollow carbon fibril content) | | (1.2) | (1.5) | (1.8) |
| Other conductive material | | — | — | — |
| Properties | | | | |
| Flexural modulus | MPa | 2,290 | 2,320 | 2,360 |
| Deflection temperature under load | ° C. | 134 | 134 | 134 |
| Izod impact strength | J/m | 470 | 450 | 430 |
| Surface resistance | Ω | $2 \times 10^7$ | $4 \times 10^6$ | $1 \times 10^5$ |
| Anti-static performance | | | | |
| Static charge relative value | mA | 0.2 | 0.1 | 0 |
| Half-value period | sec | 1 | 1 | 0 |
| Dispersing condition of hollow carbon fibril | | | | |
| Independent/agglomerated fibril ratio | — | 14/86 | 17/83 | 17/83 |
| Average length of independent fibrils | nm | 59 | 64 | 60 |

TABLE 4

| Evaluation items | Unit | Ref. Ex. 4 | Ref. Ex. 5 | Ref. Ex. 6 | Ref. Ex. 7 | Ref. Ex. 8 |
|---|---|---|---|---|---|---|
| Composition | | | | | | |
| PC | wt. % | 88 | 88 | 70 | 85 | 94 |
| Master batch PC/15BN | | 12 | 12 | 30 | — | — |
| (Hollow carbon fibril content) | | (1.8) | (1.8) | (4.5) | — | — |
| Other conductive material | | — | — | — | CF 15 | CB 6 |
| Properties | | | | | | |
| Flexural modulus | MPa | 2,350 | 2,360 | 2,450 | 9,500 | 2,270 |
| Deflection temperature under load | °C. | 134 | 133 | 132 | 144 | 133 |
| Izod impact strength | J/m | 120 | 140 | 70 | 85 | 135 |
| Surface resistance | Ω | $\geq 1 \times 10^{13}$ | $\geq 1 \times 10^{13}$ | $6 \times 10^6$ | $3 \times 10^1$ | $\geq 1 \times 10^{13}$ |
| Anti-static performance | | | | | | |
| Static charge relative value | mA | 21 | 21 | 0.1 | 0.6 | 21 |
| Half-value period | sec | $\geq 600$ | $\geq 600$ | 1 | 210 | $\geq 600$ |
| Dispersing condition of hollow carbon fibril | | | | | | |
| Independent/agglomerated fibril ratio | — | 28/72 | 7/93 | 31/69 | — | — |
| Average length of independent fibrils | nm | 18 | 77 | 17 | — | — |

TABLE 5

| Evaluation items | Unit | Ex. 10 | Ex. 11 | Ex. 12 | Ex. 13 |
|---|---|---|---|---|---|
| Composition | wt. % | | | | |
| <First feed> | | | | | |
| PPE | | 34.3 | 34.3 | 39.3 | 27.3 |
| MANH | | 0.7 | 0.7 | 0.7 | 0.7 |
| SEBS | | 9 | 9 | 7 | 8 |
| <Second feed> | | | | | |
| Kind of polyamide | | PA-1 | PA-1 | PA-1 | PA-1 |
| PA6 | | 50 | 47 | 45 | 56 |
| Master batch PA/20BN | | 6 | 9 | 8 | 8 |
| (Hollow carbon fibril content) | | (1.2) | (1.8) | (1.6) | (1.6) |
| Properties | | | | | |
| Flexural modulus | MPa | 2,450 | 2,500 | 2,450 | 2,470 |
| Deflection temperature under load | °C. | 188 | 189 | 192 | 187 |
| Izod impact strength | J/m | 200 | 188 | 130 | 170 |
| Surface resistance | Ω | $5 \times 10^7$ | $3 \times 10^5$ | $6 \times 10^6$ | $5 \times 10^6$ |
| Dispersing condition of hollow carbon fibril | | | | | |
| Independent/agglomerated fibril ratio | — | 20/80 | 18/82 | 17/83 | 19/81 |
| Average length of independent fibrils | nm | 53 | 64 | 60 | 59 |

TABLE 6

| Evaluation items | Unit | Ref. Ex. 9 | Ref. Ex. 10 | Ref. Ex. 11 |
|---|---|---|---|---|
| Composition | wt. % | | | |
| <First feed> | | | | |
| PPE | | 34.3 | 34.3 | 34.3 |
| MANH | | 0.7 | 0.7 | 0.7 |
| SEBS | | 9 | 9 | 9 |
| Kind of polyamide | | — | PA-1 | — |
| PA6 | | — | 47 | — |
| Master batch PA/20BN | | — | 9 | — |
| (Hollow carbon fibril content) | | — | (1.8) | — |
| <Second feed> | | | | |
| Kind of polyamide | | PA-1 | — | PA-2 |
| PA6 | | 47 | — | 47 |
| Master batch PA/20BN | | 9 | — | 9 |
| (Hollow carbon fibril content) | | (1.8) | — | (1.8) |
| Properties | | | | |
| Flexural modulus | MPa | 2,460 | 2,460 | 2,440 |
| Deflection temperature under load | °C. | 189 | 183 | 188 |
| Izod impact strength | J/m | 122 | 40 | 189 |
| Surface resistance | Ω | $\geq 1 \times 10^{13}$ | $\geq 1 \times 10^3$ | $\geq 1 \times 10^{13}$ |
| Dispersing condition of hollow carbon fibril | | | | |
| Independent/agglomerated fibril ratio | — | 25/75 | 7/93 | 26/74 |
| Average length of independent fibrils | nm | 17 | 76 | 18 |

TABLE 7

| Evaluation items | Unit | Ex. 14 | Ex. 15 | Ex. 16 |
|---|---|---|---|---|
| Composition | wt. % | | | |
| PC | | 58 | 56 | 54 |
| PBT | | 28 | 28 | 28 |
| EXL | | 6 | 6 | 6 |
| Master batch PC/15BN | | 8 | 10 | 12 |

TABLE 7-continued

| Evaluation items | Unit | Ex. 14 | Ex. 15 | Ex. 16 |
|---|---|---|---|---|
| (Hollow carbon fibril content) | | (1.2) | (1.5) | (1.8) |
| Properties | | | | |
| Flexural modulus | MPa | 2,220 | 2,270 | 2,310 |
| Deflection temperature under load | °C. | 110 | 111 | 111 |
| Izod impact strength | J/m | 660 | 610 | 540 |
| Surface resistance | Ω | $6 \times 10^8$ | $4 \times 10^7$ | $4 \times 10^6$ |
| Dispersing condition of hollow carbon fibril | | | | |
| Independent/agglomerated fibril ratio | — | 15/85 | 19/81 | 16/84 |
| Average length of independent fibrils | nm | 58 | 63 | 52 |

TABLE 8

| Evaluation items | Unit | Ref. Ex. 12 | Ref. Ex. 13 | Ref. Ex. 14 |
|---|---|---|---|---|
| Composition | wt. % | | | |
| PC | | 54 | 36 | 65.6 |
| PBT | | 28 | 28 | 28 |
| EXL | | 6 | 6 | 6 |
| Master batch PC/15BN | | 12 | 30 | 0.4 |
| (Hollow carbon fibril content) | | (1.8) | (4.5) | (0.06) |
| Properties | | | | |
| Flexural modulus | MPa | 2,310 | 2,380 | 2,200 |
| Deflection temperature under load | °C. | 108 | 106 | 110 |
| Izod impact strength | J/m | 230 | 96 | 680 |
| Surface resistance | Ω | $\geq 1 \times 10^{13}$ | $4 \times 10^6$ | $\geq 1 \times 10^{13}$ |
| Dispersing condition of hollow carbon fibril | | | | |
| Independent/agglomerated fibril ratio | — | 24/76 | 29/71 | 13/87 |
| Average length of independent fibrils | nm | 18 | 16 | 82 |

TABLE 9

| Evaluation items | Unit | Ex. 17 | Ex. 18 | Ref. Ex. 15 |
|---|---|---|---|---|
| Composition | wt. % | | | |
| PPE | | 40 | 50 | 50 |
| PS | | 52 | 40 | 40 |
| Master batch PS/20BN | | 8 | 10 | 10 |
| (Hollow carbon fibril content) | | (1.6) | (2.0) | (2.0) |
| Properties | | | | |
| Flexural modulus | MPa | 2,400 | 2,450 | 2,450 |
| Deflection temperature under load | °C. | 130 | 140 | 140 |
| Izod impact strength | J/m | 190 | 230 | 120 |
| Surface resistance | Ω | $3 \times 10^7$ | $7 \times 10^6$ | $\geq 1 \times 10^3$ |
| Anti-static performance | | | | |
| Static charge relative value | mA | 0.3 | 0.2 | 20 |
| Half-value period | sec | 1 | 1 | $\geq 600$ |
| Dispersing condition of hollow carbon fibril | | | | |
| Independent/agglomerated fibril ratio | — | 15/85 | 18/82 | 29/71 |
| Average length of independent fibrils | nm | 58 | 65 | 18 |

What is claimed is:

1. A thermoplastic resin composition comprising a thermoplastic resin and hollow carbon fibrils dispersed in the thermoplastic resin, wherein the thermoplastic resin comprises at least one resin selected from the group consisting of polycarbonates, polyphenylene ethers, polyamides. polyesters and aromatic vinyl compound polymers, and the hollow carbon fibrils being present in an amount of 0.1 to 20% by weight based on the total weight of the composition, comprising independent fibrils and agglomerated fibrils, and having such a dispersing condition, when represented by indices based on the measurement of transmission electron microphotograph, that the ratio of the independent fibrils to the agglomerated fibrils lies within the range of 8/92 to 40/60 and the independent fibrils have an average length of 20 to 200 nm.

2. A thermoplastic resin composition according to claim 1, wherein the hollow carbon fibrils have an outer diameter of 3.5 to 70 nm.

3. A molded product formed from the thermoplastic resin composition as defined in claim 1.

4. A molded product according to claim 3, wherein the hollow carbon fibrils have an outer diameter of 3.5 to 70 nm.

5. A molded product according to claim 3, wherein the molded product has a surface resistance of $10^2$ to $10^{12} \Omega$.

6. A molded product according to claim 3, wherein the thermoplastic resin is a blended mixture of polycarbonate and polyester.

7. A molded product according to claim 3, wherein the thermoplastic resin is a blended mixture of polyphenylene ether and polyamide.

8. A thermoplastic resin composition according to claim 1, wherein the thermoplastic resin is selected from the group consisting of a polycarbonate, a blended mixture of polycarbonate and polyester, a blended mixture of polyphenylene ether and an aromatic vinyl compound polymer, and a blended mixture of polyphenylene ether and polyamide.

9. A thermoplastic resin composition according to claim 1, wherein when said composition is injection-molded to obtain a molded product, said molded product has an Izod impact strength of not less than 130 J/m measured by a notched Izod impact test according to ASTM D256.

10. A thermoplastic resin composition according to claim 1, wherein the ratio of the independent fibrils to the agglomerated fibrils lies within the range of 8/92 to 30/70.

* * * * *